US009454351B2

(12) United States Patent
Anderson et al.

(10) Patent No.: US 9,454,351 B2
(45) Date of Patent: *Sep. 27, 2016

(54) CONTINUOUS DEPLOYMENT SYSTEM FOR SOFTWARE DEVELOPMENT (71) Applicant: Amazon Technologies, Inc., Reno, NV (US)

(72) Inventors: Keith H. Anderson, Bainbridge Island, WA (US); John L. Kenyon, Seattle, WA (US); Benjamin R. Hollis, Seattle, WA (US); Jill Edwards, Seattle, WA (US); Brad Reid, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/196,875

(22) Filed: Mar. 4, 2014

(65) Prior Publication Data

US 2014/0189641 A1 Jul. 3, 2014

Related U.S. Application Data (63) Continuation of application No. 13/245,539, filed on Sep. 26, 2011, now Pat. No. 8,677,315.

(51) Int. Cl.
G06F 9/44 (2006.01)
G06F 9/45 (2006.01)
(Continued)

(52) U.S. Cl.
CPC . *G06F 8/60* (2013.01); *G06F 8/71* (2013.01); *G06F 9/4411* (2013.01); *G06F 11/3668* (2013.01); *G06F 9/44526* (2013.01)

(58) Field of Classification Search
CPC ........... G06F 11/3664; G06F 11/3688; G06F 11/3696; G06F 8/61; G06F 8/71; G06F 8/34; G06F 8/65; G06F 8/60; G06F 17/3056; G06F 8/10; G06F 8/20; G06F 8/67; G06F 8/36; G06F 11/2236; G06F 11/3684; G06F 9/44526; G06F 9/44505; G06F 9/4411; G06Q 10/06

See application file for complete search history.

(56) References Cited

U.S. PATENT DOCUMENTS 5,651,111 A * 7/1997 McKeeman ........ G06F 11/3688 714/38.1
7,080,351 B1 * 7/2006 Kirkpatrick ............ G06Q 10/06 717/102

(Continued)

OTHER PUBLICATIONS

Helio R. Costa et al., Evaluating software project portfolio risks, 2006, [Retrieved on May 11, 2016]. Retrieved from the internet: <URL: http://ac.els-cdn.com/S0164121206001269/1-s2.0-S0164121206001269-main.pdf> 16 Pages (16-30).*

(Continued)

*Primary Examiner* — Thuy Dao
*Assistant Examiner* — Anibal Rivera
(74) *Attorney, Agent, or Firm* — Knobbe, Martens, Olson & Bear, LLP (57) ABSTRACT Examples of a continuous deployment system are provided that manage and track releases of software code, where some or all of the steps between check-in and deployment to production can be automated. Such systems can reduce the amount of developer effort needed to deploy a package, as developers may not have to be responsible for scheduling package builds, clicking deployment buttons, or manually running tests. The system can take care of all or some of that work.

20 Claims, 6 Drawing Sheets (51) Int. Cl.
    *G06F 9/445*    (2006.01)
    *G06F 11/36*    (2006.01)

(56) References Cited

U.S. PATENT DOCUMENTS

| | | | | |
|---|---|---|---|---|
| 7,437,712 B1* | 10/2008 | Brown | G06F 8/71 | 717/121 |
| 7,568,183 B1* | 7/2009 | Hardy | G06F 11/3684 | 717/121 |
| 8,060,585 B2* | 11/2011 | Waud | G06F 8/67 | 709/218 |
| 8,176,483 B2 | 5/2012 | Hoefler et al. | | |
| 8,225,281 B1* | 7/2012 | Hardinger | G06F 11/3664 | 717/120 |
| 8,490,084 B1* | 7/2013 | Alford | G06F 8/61 | 717/177 |
| 8,677,315 B1 | 3/2014 | Anderson et al. | | |
| 2003/0182652 A1* | 9/2003 | Custodio | G06F 8/61 | 717/122 |
| 2004/0261053 A1* | 12/2004 | Dougherty | G06F 8/20 | 717/101 |
| 2004/0261070 A1* | 12/2004 | Miller | G06F 8/71 | 717/170 |
| 2005/0015762 A1* | 1/2005 | Steckler | G06F 8/71 | 717/176 |
| 2005/0044531 A1* | 2/2005 | Chawla | G06F 8/71 | 717/122 |
| 2005/0108685 A1* | 5/2005 | Ta | G06F 8/71 | 717/120 |
| 2005/0114829 A1* | 5/2005 | Robin | G06Q 10/06 | 717/101 |
| 2006/0212857 A1* | 9/2006 | Neumann | G06F 8/20 | 717/140 |
| 2006/0248522 A1* | 11/2006 | Lakshminarayanan | G06F 8/61 | 717/174 |
| 2007/0006122 A1* | 1/2007 | Bailey | G06F 8/61 | 717/101 |
| 2007/0061782 A1* | 3/2007 | Schreiner | G06F 11/3688 | 717/124 |
| 2007/0083859 A1* | 4/2007 | Fussell | G06F 8/71 | 717/168 |
| 2007/0234316 A1* | 10/2007 | Bayerlein | G06F 8/71 | 717/140 |
| 2008/0098385 A1* | 4/2008 | Alger | G06F 9/44505 | 717/174 |
| 2009/0019420 A1* | 1/2009 | Johnson | G06F 8/36 | 717/101 |
| 2009/0070734 A1 | 3/2009 | Dixon et al. | | |
| 2010/0058294 A1* | 3/2010 | Best | G06F 11/3688 | 717/122 |
| 2010/0088498 A1* | 4/2010 | Kreek | G06F 9/4411 | 713/1 |
| 2010/0162226 A1* | 6/2010 | Borissov | G06F 8/67 | 717/173 |
| 2010/0235807 A1* | 9/2010 | Doddappa | G06F 8/10 | 717/101 |
| 2010/0287547 A1* | 11/2010 | Korkishko | H04W 12/10 | 717/177 |
| 2011/0029963 A1* | 2/2011 | Smith | H04L 67/34 | 717/171 |
| 2011/0173591 A1* | 7/2011 | Prasad | G06F 8/10 | 717/126 |
| 2011/0225217 A1* | 9/2011 | Plax | G06F 17/3056 | 707/825 |
| 2011/0283253 A1* | 11/2011 | Dutta | G06F 8/10 | 717/105 |
| 2011/0302472 A1* | 12/2011 | Van Eikema Hommes | G06F 11/2236 | 714/742 |
| 2012/0159423 A1* | 6/2012 | Becker | G06F 9/44526 | 717/102 |

OTHER PUBLICATIONS

Meira Levy et al., Agile Knowledge Management, 2009, [Retrieved on May 11, 2016]. Retrieved from the internet: <URL: http://mfile.narotama.ac.id/files/Information%20System/Encyclopedia%-20of%20Information%20Science%20and%20Technology%20-(2nd%20Edition)/Agile%20Knowledge%20Management.pdf> 6 Pages (112-117).*

E. Ries, Continuous deployment in 5 easy steps, O'Reilly Radar, http://radar.oreilly.com/2009/03/continuous-deployment-5-eas.html, dated Mar. 30, 2009, retrieved on Oct. 5, 2011.

D. Farley, The Deployment Pipeline, CruiseControl Enterprise, 2007.

B. Durrett, Scaling with Continuous Deployment, PowerPoint slides from Developer Summit, dated Jun. 29, 2010.

M. Fowler, Continuous Integration, http://martinfowler.com/articles/continuousIntegration.html, dated May 1, 2006, retrieved on Oct. 6, 2011.

Michael Fagan, Design and code Inspection to Reduce Errors in Program Development, 1976, IBM Systems Journal, [Retrieved on Oct. 25, 2013]. Retrieved from the internet: <URL: http://download.springer.com/static/pdf/816/chp%253A10.1007%252F978-3-642-48354-7_13.pdf?auth66=1382893893_21dcebd439da29a39934b7b3df758119&ext=.pdf> 33 Pages (301-334).

Larry Allen et al., Clearcase multisite: Supporting geographically-distributed software development, 1995, [Retrieved on Oct. 25, 2013] Retrieved from the internet: <URL: http://download.springer.com/static/pdf/955/chp%253A10.1007%252F3-540-60578-9_18.pdf?auth66=1382894450_7e393ae9de07ed56e65a2ef4445b105c&ext=.pdf> 21 Pages (194-214).

* cited by examiner

| Pipeline | Change Progress | Change Progress By Time | Timeline | Audit History | Edit |

Filter changes

☑ 80 changes in 36 packages

☑ 2 changes in 2 packages
RubyGem-delayed_job/delayed_job-2.0.3@3591145
8 months ago by mcmoore
Followed the instructions on HowToImportARubyGem [1] in order
to get the gem to compile.

RubyGem-ghazel-daemons/ghazel-daemons-1.0.13@3599635
8 months ago by mcmoore
Followed the instructions on HowToImportARubyGem [1] in order
to get the gem to compile.

☑ 82 changes in 82 packages
ALFModel/mainline@478019    4 months ago by gdierkes
Fix for capturing the correct element tag name.
AWSJavaClientRuntime/mainline@488644

VersionSet | Beta

CONTINUOUS DEPLOYMENT SYSTEM FOR SOFTWARE DEVELOPMENT

CROSS-REFERENCE TO RELATED APPLICATIONS

This application is a continuation of U.S. patent application Ser. No. 13/245,539, filed Sep. 26, 2011, entitled "Continuous Deployment System for Software Development," which is hereby incorporated by reference herein in its entirety.

BACKGROUND

More and more companies are now incorporating computers and software services into many facets of their business. These companies are using software to provide more and more complex services. The complexity of these services has, in turn, increased the functionality required from the software that provides these services. Thus, software projects have become more complex and software development of large applications is typically a lengthy process, requiring multiple developers many months to complete development. The increased complexity in the software development process has made the task of administering and managing software challenging.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

During software development, the developers make many changes to the source code. Typically, changes are made to the source code in batches, with each batch of changes deployed in a new revision of the code base. Each revision can be separated from the previous revision by several weeks. As a result, changes made to fix software bugs that have been found may not be tested in a production environment until weeks later, when the problem is no longer fresh on the developer's mind. In addition, such changes are usually made with many other changes, making diagnosing problems in the production environment more difficult. Increasing complexity of software may make bugs and errors in source code more common and harder to diagnose. Thus, an efficient and streamlined process for deployment of changes to source code is needed.

Embodiments of a continuous deployment system ("CDS") are described below. In one embodiment, a continuous deployment system is a system that manages and tracks releases of software code where the steps between check-in and deployment to production are preferably automated. This can reduce the amount of developer effort needed to deploy a package, as developers do not have to be responsible for scheduling package builds, clicking deployment buttons or running tests. The automation can take care of all or some of that work.

Allowing code to be deployed in an automated fashion allows latency to be reduced from check-in of code to release of the code to production. Changes can go out to production as soon as they are ready. For example, delays due to waiting for people to authorize or initiate code release can be reduced or eliminated. As a result, customers can get faster releases of software.

Another potential benefit of some continuous deployment systems is that a fast cycle time for getting changes to production allows bug fixes or patches to quickly get into production. Under non-continuous deployment systems, typically a special patch version would be created to leave out changes that aren't yet ready for production, however, the continuous deployment system allows bug fixes to be treated like any other code change, allowing the bug fix to be checked in and to go into production.

As changes can go out more frequently, deployments usually can be smaller, containing a small number of changes. Thus, debugging can be easier, as there are fewer potential causes of bugs. Further, since changes can go out more frequently and in smaller batches, if bugs are introduced, failure of the code will happen faster and bugs can be caught sooner, when the code is still fresh in the developers mind. This can make it easier to find and fix bugs.

Further, in one embodiment, the continuous deployment system allows a release process to be defined and applied to all or selected future code changes. The same tests and process can be applied to each code, building consistency in the process. For example, a test can be written that checks that a particular bug has been fired, and that test can be run for all subsequent code changes. By re-running the test on new code changes, the continuous deployment system can check that those code changes do not reintroduce the same bug. Further, improvements can be added to the process to allow best practices to be implemented, allowing the process to continually evolve and improve.

In one embodiment, the continuous deployment system allows a user to define a release process that can be visualized and automated. The continuous deployment system can represent the release as a pipeline to the user, with the pipeline having multiple stages and promotion configurations defining how promotions occur between stages. The promotion configurations can define requirements or instructions for passing to the next stage (e.g. build to an application, deploy to a first environment, promote from Alpha to Development stage or the like). The continuous deployment system can allow users to set up automated test workflows to verify and approve the changes at each stage. Then the promotion configuration moves the latest approved changes to the next stage in the pipeline.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of Continuous Deployment Systems

Figure 1:
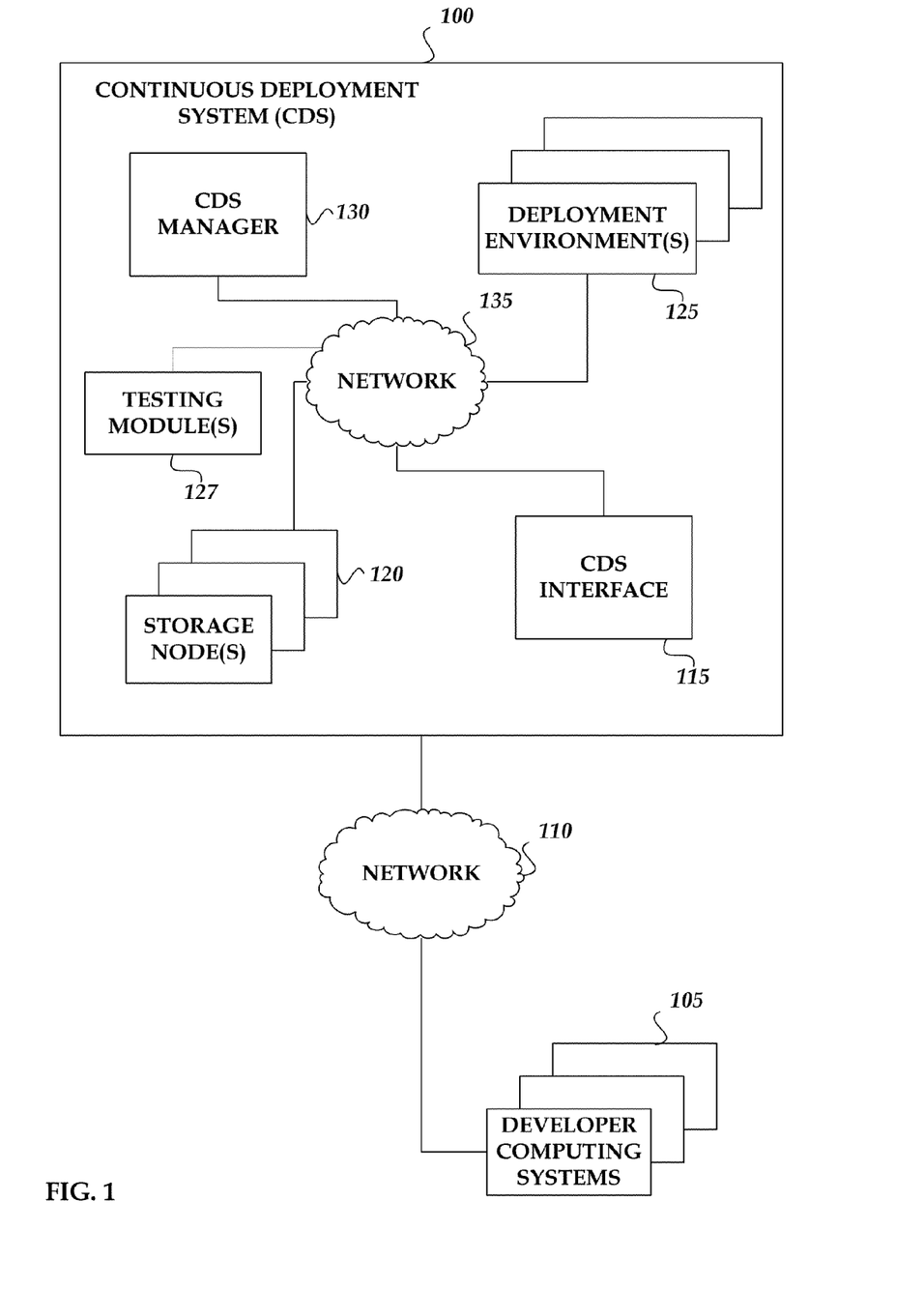
FIG. 1 is a network diagram schematically illustrating an example of a continuous deployment system that manages and tracks releases of software code submitted by developers.

FIG. 1 is a network diagram schematically illustrating an example of a continuous deployment system ("CDS") 100 that manages and tracks releases of software code submitted by developers. In the illustrated embodiment of FIG. 1, the continuous deployment system 100 communicates with developer computing systems 105 using a network 110. The continuous deployment system 100 can receive source code changes from the developer computing systems 105, generate source code packages, and deploy the packages.

The continuous deployment system 100 can include any system capable of receiving source code changes and deploying those code changes onto deployment environments. The continuous deployment system 100 can include a CDS interface 115, which can include one or more servers (e.g., a web server) configured to receive and respond to requests from the developer systems 105. The continuous deployment system 100 can also include storage nodes 120 for storing source code related data (e.g., code changes, code versions, versioning data, change history, code backups, code metadata, developer identifications, continuous deployment system events or the like). Other services may also be provided by the continuous deployment system 100. The storage nodes 120 may comprise any type of persistent data storage, for example non-volatile memory devices such as, e.g., hard disk drives, optical disk drives, etc.

Developers, using their computing systems 105, can develop applications and submit source code for those applications to the continuous deployment system 100, which can track and monitor such source code. The developer computing systems 105 can include wireless mobile devices (such as smart phones, PDAs, tablets or the like), desktops and laptops, to name a few. Changes to the source code can be received by the continuous deployment system 100, which can then generate packages to be applied to an existing code base deployed on deployment environments 125.

Typically, a deployment environment 125 can include one or more computing systems capable of running the software packages built from the source code. In one embodiment, the deployment environment 125 can include one or more computing nodes configured to emulate computer hardware of the production environment. For example, the continuous deployment system 100 can use one or more computing nodes or testing modules 127 that can execute and test software programs. The computing nodes or testing modules may comprise one or more physical computing systems and/or one or more virtual machines instances that are hosted on one or more physical computing systems. For example, a host computing system may provide multiple virtual machines instances and include a virtual machine ("VM") manager to manage those virtual machines (e.g., a hypervisor or other virtual machine monitor). In one embodiment, the testing modules 127 can be internal or external systems capable of running one or more tests on the software packages operating on the deployment environment 125. In some embodiments, the deployment environment may only partially simulate the production environment, for example, if only limited testing is being conducted or if simulating the production environment is not otherwise needed.

A CDS manager 130 may monitor, track and/or manage the processes of the continuous deployment system 100. The CDS manager 130 can be in communication with other components of the continuous deployment system 100 via a network 135. In the example illustrated in FIG. 1, the CDS manager can access the CDS interface 115, storage nodes 120, and deployment environments 125 via the network 135. The network 135 may include multiple networking devices (not shown) such as, e.g., switches, edge routers, core routers, etc. The network 135 may, but need not be, a different network than the network 110 shown in FIG. 1.

In some embodiments, the continuous deployment system 100 and its components are executed or embodied by one or more physical or virtual computing systems. For example, in some embodiments, a server computing system that has components including a central processing unit (CPU), input/output (I/O) components, storage, and memory may be used to execute some or all of the components of the continuous deployment system 100 such as, e.g., the CDS manager 130. The I/O components include a display, a network connection to the network 135, a computer-readable media drive, and other I/O devices (e.g., a keyboard, a mouse, speakers, etc.). An embodiment of the continuous deployment system 100 can be stored as one or more executable program modules in the memory of the server, and the continuous deployment system 100 can interact with computing nodes (e.g., physical computing systems and/or virtual machine instances) over the network 135. In one embodiment, the continuous deployment system 100 may have additional components or fewer components than described above. For example, the continuous deployment system 100 may be built on top of existing software development or testing systems and designed to coordinate the actions of the existing systems.

Figure 2:
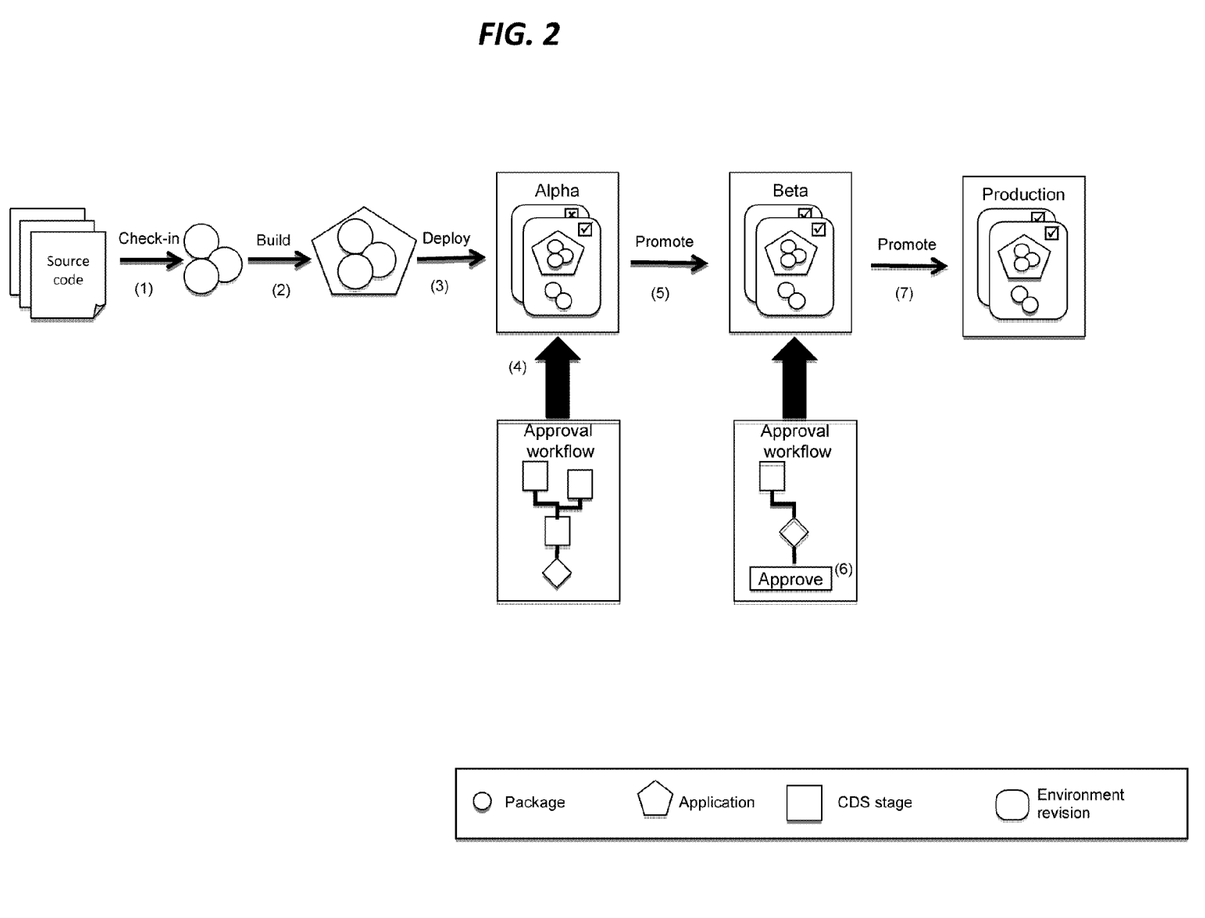
FIG. 2 schematically illustrates a logical flow diagram for an example software project scenario involving the continuous deployment system of FIG. 1.

FIG. 2 schematically illustrates a logical flow diagram for an example software project scenario. In some implementations, services are provided by embodiments of the continuous deployment system 100 described with reference to FIG. 1 or by one of its components, such as the CDS interface 115 or CDS manager 130. For ease of explanation, the following describes the services as performed by the continuous deployment system 100. The example scenario is intended to illustrate, but not to limit, various aspects of the continuous deployment system 100. As illustrated in FIG. 2 and further described below, the following events occur during the example scenario:

1. Source code changes are checked in to a package (and/or branch).
2. Packages are built into an application.
3. The application is deployed to a CDS stage (e.g., deployment environment), the packages of which form an environment revision.
4. An Approval Workflow tests the environment revision.
5. If the Approval Workflow is successful, the environment revision is marked as "Approved". The latest approved environment revision is promoted to the next stage.
6. An Approval Workflow can contain separate configurable steps. The final step can be a manual approval button.

7. An approved environment revision (e.g., the latest) is promoted to the production stage.

At event 1, source code changes are submitted to the continuous deployment system 100. The continuous deployment system 100 can check in the source code changes to a package (and/or release branch). The continuous deployment system 100 can receive the source code changes on an interface, such as an application interface (e.g., a web server), an Application Programming Interface (API), a user interface, or other type of interface. The source code changes can be saved onto a storage node 120 for the source code.

At event 2, packages are built into an application. In one embodiment, the application is a revision controlled dependency closure that includes all the other software packages depended upon by the modified source code to function. Generally, a revision is a set of changes. Software packages having changes are built into an application to create an application revision. For example, there could be revisions 1.0 and 1.1 of an application of the same set of source code, with the revisions being different from each other because of changes implemented in the source code. An application revision deployed to an environment creates an environment revision in some embodiments.

Specific versions of the other software packages can be included in the application to allow more consistent behavior of the software. For example, if modified package A has dependencies for particular versions of package B and package C, then those versions of package B and C can be included into the application.

At event 3, the application is deployed to a CDS stage (referred to as "Alpha" in FIG. 2). The CDS stage can include one or more deployment environments 125, such as a testing environment that simulates the operation of a production environment. There may be other packages that were deployed separately to the CDS stage that, together with the deployed application, constitutes an environment revision in the example shown in FIG. 2. For example, the other packages may have been deployed by another developer or by the same developer at a different time. There can be multiple applications of the software project in the Alpha stage, for example, if a software project includes multiple, independently functioning sets of packages or if different revisions of the same application have been deployed. There may also be multiple versions sets corresponding to different versions of the same packages or sets of packages. For example, there may be a version 1.0 and a version 1.1 (e.g., a different source code fork) of a package on the Alpha Stage at the same time.

At event 4 of FIG. 2, an approval workflow is used to test the environment revision. Generally, the approval workflow includes the set of steps used to verify that a revision is approved. The approval workflow can be run whenever a new revision shows up in a stage.

The approval workflow can include automated tests for the environment revision. For example, test programs or test scripts can be run against the environment revision to test the behavior of the environment revision. Multiple tests can be run to test particular functionality or to verify that previous bugs have not been reintroduced. In one embodiment, the approval workflow contains separate configurable steps. Each step can correspond to a discrete test. The final step (or other steps) can request a manual approval or other manual action. For example, the approval workflow may require that an administrator, developer, project leader or other user of the continuous deployment system 100 to approve the promotion to the next stage, for example, by pressing an approve button.

In one embodiment, the approval workflow is applied automatically to the environment revision during its deployment to the CDS stage or during the deployment of packages in the environment revision. In some embodiments, the approval workflow may be applied according to a schedule. For example, the approval workflow can be run during times of less activity, such as at night or on the weekends, in order to keep the responsiveness and/or performance of the continuous deployment system 100 high during busier times.

At event 5, if the approval workflow is passed and the environment revision is approved (automatically or manually), the environment revision is promoted to the next CDS stage (referred to as "Beta" in FIG. 2). This stage can include different approval workflows and/or different deployment environments. For example, the Beta stage may have deployment environments that are configured to more closely match or duplicate the production environment than Alpha. In another example, the Beta stage may include all or most of the packages for the final software release, thereby allowing a more thorough or complete testing of the packages, for example, by allowing testing of the interactions between all the different packages.

At event 6, a second approval workflow is applied to the environment revision. In some embodiments, the promotion to the destination (e.g., the production environment) may require manual approval. For example, automated tests may be performed and, if passed, the continuous deployment system 100 can then notify the user in charge of the software release that the release is ready for deployment. The user can then manually approve the deployment. By providing a mechanism for manual approval, the continuous deployment system 100 system can allow gradual adoption of automation, allowing users to gain confidence in their automated tests and procedures.

At event 7, an approved revision is promoted to the production stage (referred to as "Production" in FIG. 2). The promotion may be initiated by a manual approval, a timer, a scheduled event, a time window or other deployment conditions being satisfied. In some situations, there may be multiple revision sets that have been approved on the Beta stage. For example, while the continuous deployment system 100 is waiting for deployment approval, other revisions may have been promoted to the Beta stage. Thus, there can be multiple revisions from the same source (e.g., applications or packages) qualified for promotion.

In some embodiments, the continuous deployment system 100 determines which environment revision to promote, such as the latest approved revision. For example, the continuous deployment system 100 may examine the source code files of the revisions to determine which files were submitted last and promote the revision with the newest files. In another example, the revisions may be tagged or associated with a revision number or identifier, and the continuous deployment system 100 promotes the revision with the highest number or a revision specified as a priority revision. In another example, the revisions may be promoted based on the number of tests passed during testing or the performance of the revisions during testing. In one embodiment, if the destination of a promotion is out of sync with the latest approved revision of its source, then that latest revision is promoted to the destination, thereby updating the destination stage. In some situations, the promotion destination for a revision may have other applications or packages for a different version (e.g., older version) of the software project than the revision. In those situations, the continuous deployment system 100 can promote the application for the same revision as the applications on the destination. For example, if the source stage has approved application A, revision 1.1 and revision 1.2 and the destination stage has application B, revision 1.1, then the continuous deployment system 100 can promote application A, revision 1.1, since it corresponds with the application B on the destination stage. This can be beneficial since different revisions may not be compatible, for example, if certain functionality was implemented in the newer revision that wasn't implemented in the older revision.

In some embodiments, promotions between stages are handled by automation agents or software modules or processes. In some such embodiments, the agents may operate in the background. For example, there may be AutoBuild, AutoPromote, and AutoDeploy agents. The user can interface with those agents in order to approve promotions. The user can also configure those agents to setup promotion configurations which define which sources promote to which destinations.

In one embodiment, the AutoBuild agent watches for new changes in package branches or other source code collections, then triggers builds into applications. For example, the AutoBuild agent can check the date stamps of files to identify changes or search for files that have been marked as changed. Once built, the applications can be treated as normal package builds submitted by a developer. In one embodiment, the AutoBuild agent is configured to automatically build an application when a developer checks-in a change to a package associated with AutoBuild. In one embodiment, the user can determine and select which packages the AutoBuild agent is associated with and disable or enable monitoring by the AutoBuild agent on a per package basis.

In one embodiment, the AutoBuild agent can check for changes after an interval of time has passed (e.g., every minute or every hour). If the AutoBuild agent detects multiple package changes in the same application, the AutoBuild agent can group the package changes into one build request. In one embodiment, if a build submitted by the AutoBuild agent fails, the agent will retry building when new changes are received.

In one embodiment, if the AutoDeploy agent sees a deployment environment is out of sync with a application on the CDS stage associated with the deployment environment, the agent triggers a deployment. For example, if application revision 1.1 has been promoted to the CDS stage but only revision 1.0 is on the deployment environments, the AutoDeploy agent can update the deployment environments with revision 1.1. In one embodiment, deployments of an application to the first CDS stage in a pipeline does not require an approval (e.g., a new application revision building successfully counts as the approval to deploy) but an approval workflow can be added to perform additional verification before deploying.

In one embodiment, if the AutoPromote agent sees a deployment environment (e.g., in Beta stage) out of sync with the latest approved version of its source deployment environment (e.g., in Alpha stage) from which the deployment environment receives software packages, it creates a promotion deployment. Approval for the promotion can be granted automatically based on passing an approval workflow or manually by a human. If no approval workflow is configured, the continuous deployment system 100 can wait for manual approval. Once approved, the AutoPromote agent causes the latest approved version to deploy into the deployment environment.

Promotions to stages may require approval in some embodiments but not in others. In some embodiments, if the promotion configuration is disabled or automation is off, nothing will be promoted automatically. Likewise, if there is a time window defining times when promotions can take place that is associated with the promotion configuration and that time window is closed, automated actions will hold off until the window opens. Time windows can be useful in controlling when promotions take place. For example, promotions to production could be scheduled in times of low usage, such as after midnight, where problems would have limited effect on users.

Promotion configurations can form a graph or associations between all the applications and environments in a pipeline. In one embodiment, while applications and environments are grouped into CDS stages for display purposes (e.g., on a pipeline model display), promotions are still configured on a per application and/or per deployment environment basis. In one embodiment, each application or deployment environment can only be the destination of one promotion, but each application or deployment environment can be the source of multiple promotions. For example, the application from MyVS/mainline could be deployed to MyEnv/Beta, but MyEnv/Beta could be configured to deploy to multiple deployment environments: MyEnv/NA/Prod, MyEnv/EU/Prod, and MyEnv/FE/Prod. All of the deployment environments could then receive promoted revisions when a new version of MyEnv/Beta was approved (though deployment of the new version may wait for time windows if they are configured or implemented in the system).

In other embodiments, the continuous deployment process may be fully automated. For example, once software packages are submitted to the continuous deployment system 100 by a developer, the continuous deployment system 100 automatically builds an application, deploys the application to an environment revision, and promotes the environment revision through the different stages if the approval workflows are satisfied. In cases where multiple revisions of the software packages exist, the continuous deployment system 100 can automatically select one of the multiple revisions to promote, as described above.

Other embodiments of the continuous deployment system 100 are also possible. For example, while FIG. 2 illustrates a 3 stage pipeline for a particular software release, pipelines could have additional or lesser number of CDS stages. In some embodiments, promotions may be handled with finer granularity. For example, the continuous deployment system 100 may promote package revisions or application revisions rather than, or in addition to, promoting by environment revisions.

In one embodiment, the user can specify time windows for when the continuous deployment system 100 is allowed to automatically create deployments. These time windows can be added on a per environment basis, allowing multiple time windows for each stage. The continuous deployment system 100 will then begin a deployment only when the time window is open for the environment.

Figure 3:
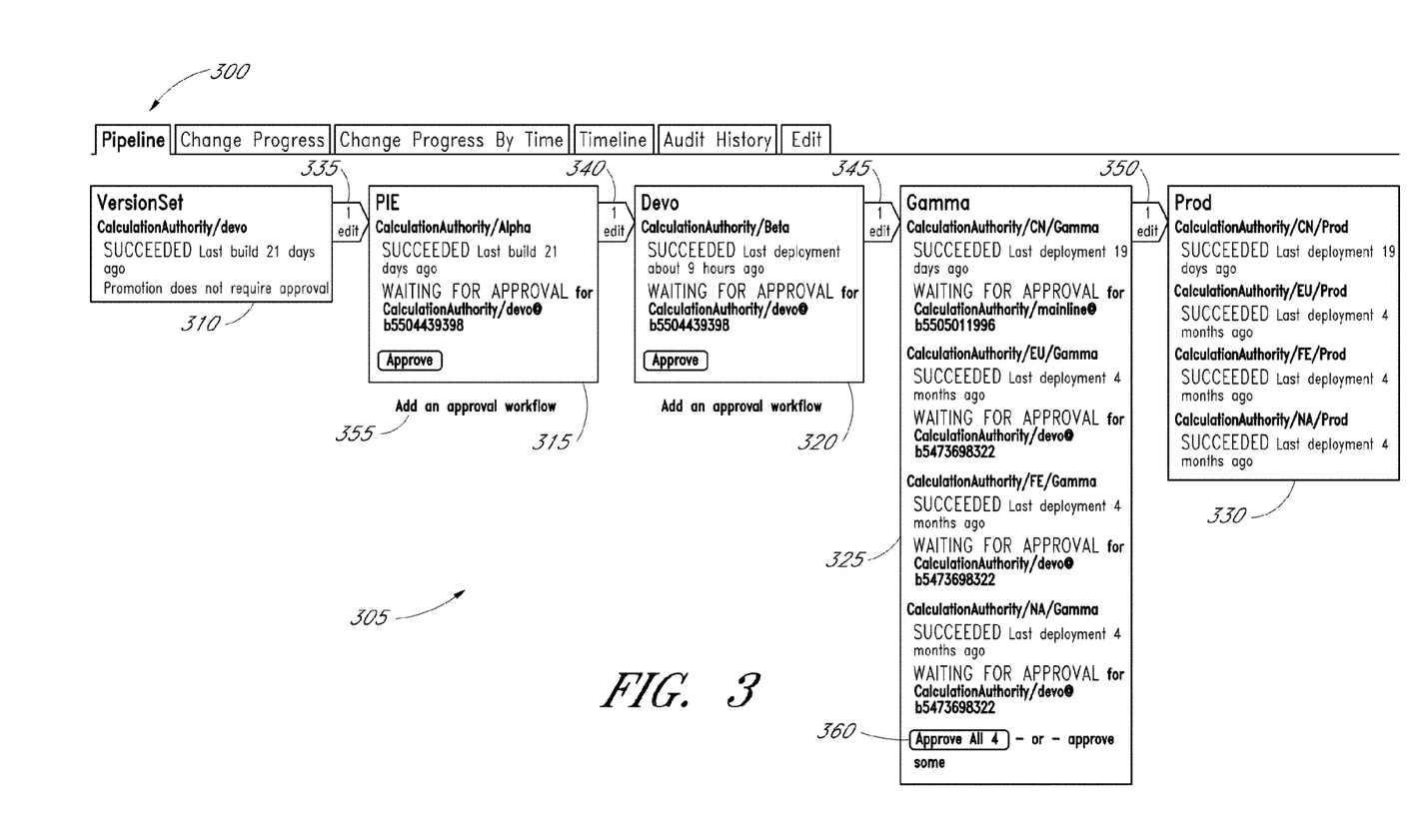
FIG. 3 illustrates an embodiment of a pipeline interface screen to the continuous deployment system of FIG. 1 displaying a pipeline model representing a deployment process.

FIG. 3 illustrates an embodiment of a pipeline interface screen 300 to the continuous deployment system 100 displaying a pipeline model representing a deployment process. The pipeline model 305 represents the path that source code takes, from check in of changes to deployment to production. The pipeline interface screen 300 allows a user to define the release process for a particular software project. It provides a visual representation of the release process and the changes flowing through it.

The pipeline 305 can include one or more CDS stages. The stages represent destinations that, in one embodiment, get the same changes at the same time. In FIG. 3, the pipeline 305 includes a application stage 310, three testing stages (referred to as "PIE" 315, "Devo" 320, and "Gamma" 325 in FIG. 3) and one production stage (referred to as "Prod" 330). Since a CDS stage can be a logical grouping, a stage can contain multiple applications and/or multiple environments. For example, the Prod stage can contain multiple deployment environments. As illustrated in FIG. 3, the Gamma stage has 4 possible destination environments (CN, EU, FE, and NA). The promotions to each destination can be processed by the continuous deployment system 100 independently. For example, the continuous deployment system 100 can request independent approval for deployments to each destination.

In one embodiment, CDS stages (or deployment environments) can be locked in order to prevent new deployments to the CDS stage from starting. This keeps the CDS stage from changing while the lock is held. Typically, an approval workflow will begin by locking the stage on which it is running. This helps to ensure that tests are run against a consistent set of software and that any approvals granted by the workflow are valid.

The promotion configurations are represented by the connections arrows 335, 340, 345, 350 between adjacent stages in a pipeline. Promotions describe where changes will go next. Promotions can be set per versions set and/or per destination environment. For example, separate promotion configurations can be set for each environment in a stage. Thus, in one embodiment, promotions can be independently determined. By clicking on one of the correction arrows 335, 340, 345, 350, the user can specify the promotions requirements between stages. A user interacting with the pipeline interface screen 300 can add an approval workflow 355, edit promotion configurations and approve promotions 360 to the next stage by interacting with the screen (e.g., selecting links or buttons, etc.).

Indicators in the pipeline screen can be used by the continuous deployment system 100 to indicate the status of different parts of the system. For example, a lock indicator can indicate than an environment is locked. A window indicator can indicate that a time window is open or closed for an environment. Additional or different indicators can also be used.

Figure 4:
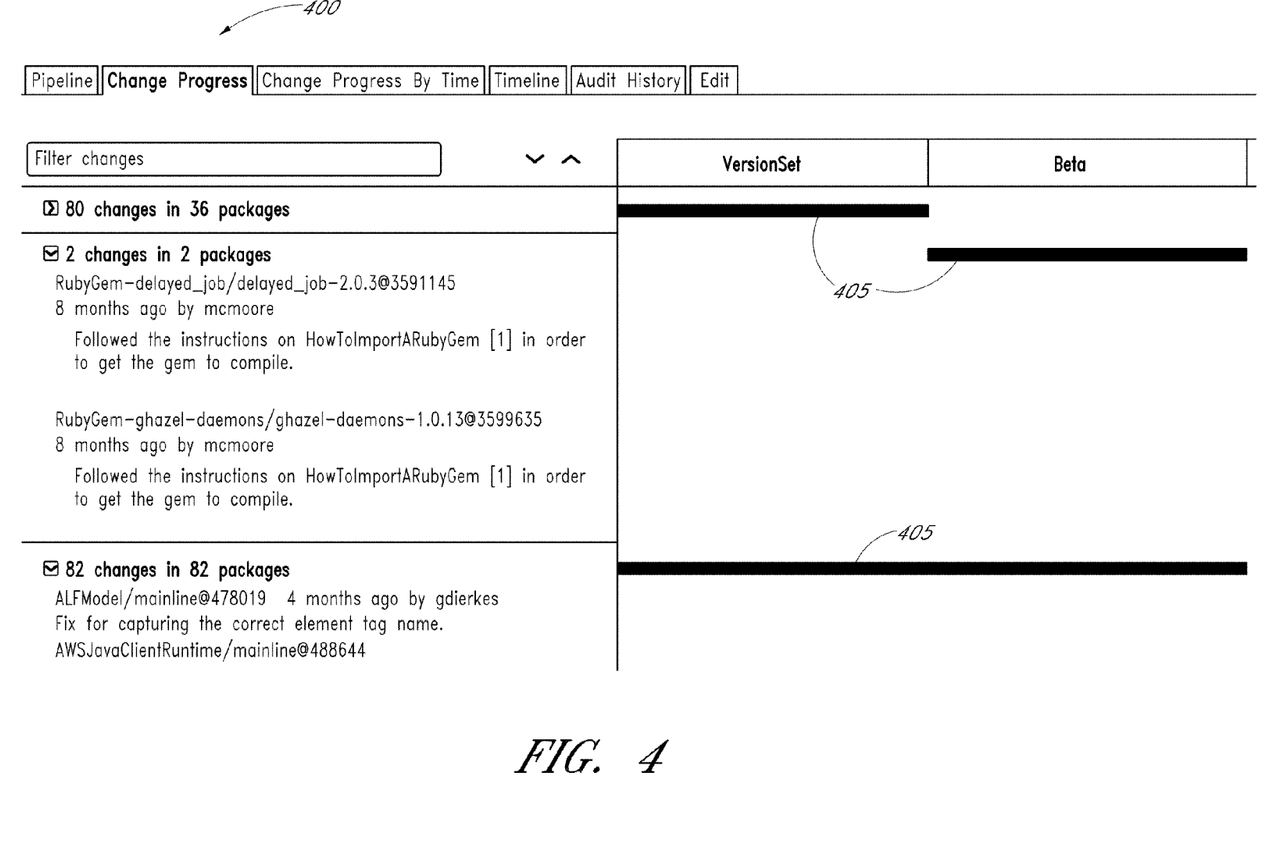
FIG. 4 illustrates an embodiment of a change progress interface screen to the continuous deployment system of FIG. 1 displaying the progress of the changes to a software project.

FIG. 4 illustrates an embodiment of a change progress interface screen 400 to the continuous deployment system 100 displaying the progress of the changes to a software project. In one embodiment, changes can be grouped by progress. The groups can be sorted by package name or chronologically. The progress interface screen 400 can display the number of changes made in the package, when the changes were made, who made the changes, and what changes were made. For example, the screen 400 can include progress bars 405 that show where changes have been made during the continuous deployment stages (e.g., changes to an application and/or to a Beta stage). The user can manipulate the screen 400 to show different views, for example, by filtering the displayed data.

Figure 5:
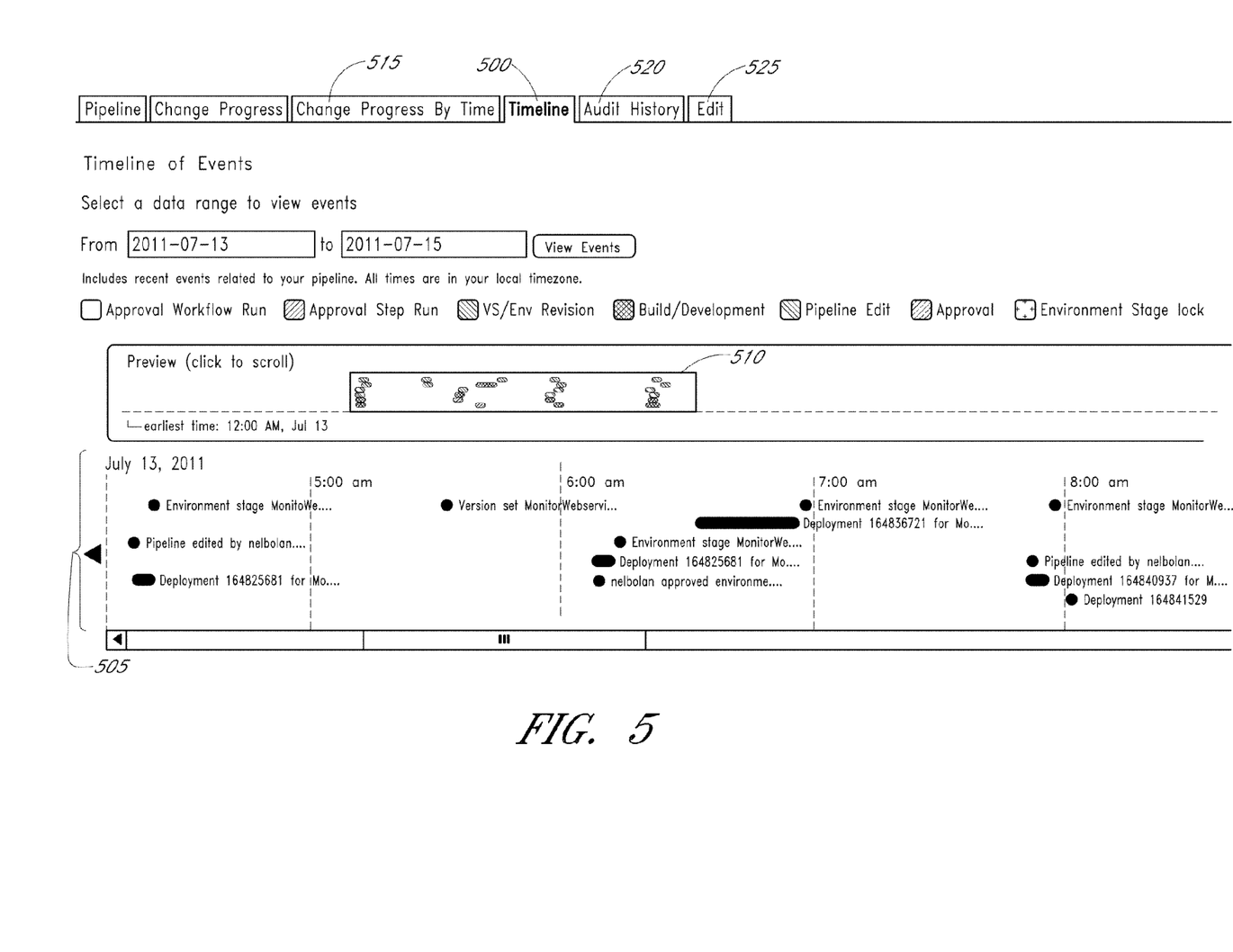
FIG. 5 illustrates an embodiment of a timeline interface screen to the continuous deployment system of FIG. 1 displaying a timeline visualization of the deployment process.

FIG. 5 illustrates an embodiment of a timeline interface screen 500 to the continuous deployment system 100 displaying a timeline visualization of the deployment process. The user can see a representation of events 505 that have occurred in the continuous deployment system 100. This can be useful for determining what was happening when a problem occurred. In some embodiments, the representations of different events can be color-coded, shaded, hatched, or highlighted so that a user can readily distinguish the different events that have occurred. The timeline can display events such as an approval workflow run, a workflow step run, a virtual set or environment revision, building or deployment of a revision or package, editing of the pipeline, approval of a promotion, locking of a CDS stage, or other continuous deployment system 100 event. The events may be displayed along a timeline, which the user can manipulate to display different times in different views (e.g., by scrolling).

The CDS interface can include additional screens to display additional information to users. For example, the CDS interface shown in FIGS. 3, 4, and 5 includes tabbed pages by which a user can view the progress of changes 515 to the software project by time, an audit history of changes 520 to a pipeline's configuration, and edits made to the software project 525. In some implementations, the change progress by time interface takes all the "in-flight" changes and orders them from most recently checked-in to oldest checked-in change. In some such implementations, in-flight changes represent changes that have not been deployed to a whole pipeline (e.g., deployed to every stage in the pipeline) or changes that were made within a particular time period (e.g., the last 36 hours). In some implementations, the audit interface displays who made a change to pipeline the configuration and when the change was made. The audit interface may permit disabling or enabling the pipeline or changing promotion configurations. The audit interface advantageously may be used to determine when something changed and who made the change. Additional or different interface display pages can be used in other embodiments.

Notifications (e.g., e-mails, text messages, etc.) may be sent to users of the CDS 100 when various events occur. The events can include: a new revision of an environment or application that requires manual approval, when a pipeline is deleted, disabled, or re-enabled, when an automation state of a pipeline's promotions is changed, when an approval workflow fails, or when an automated deployment fails. Notifications can be set for other events.

In some embodiments of the CDS system 100, compliance management can be implemented by the CDS manager 130. For example, compliance can include auditing, due diligence, and/or compliance with industry best practices or regulations. For example, a software compliance policy may be used to implement medical privacy standards under the Health Insurance Portability and Accountability Act (HIPAA), corporate accounting standards under the Sarbanes-Oxley act (SOX), fraud prevention standards under the Payment Card Industry (PCI) data security standards, information security standards under the Federal Information Security Management Act (FISMA), and so forth. In some embodiments, the CDS system 100 can monitor whether a particular software revision has been approved as complying with a compliance policy applicable to the software. In some such embodiments, the CDS system 100 will not promote the revision to the next stage in the pipeline until a compliance approval is received. The compliance approval process may be automated (e.g., the revision is passed by a compliance module) or may be manual (e.g., a human manager has signed off on the revision).

Figure 6:
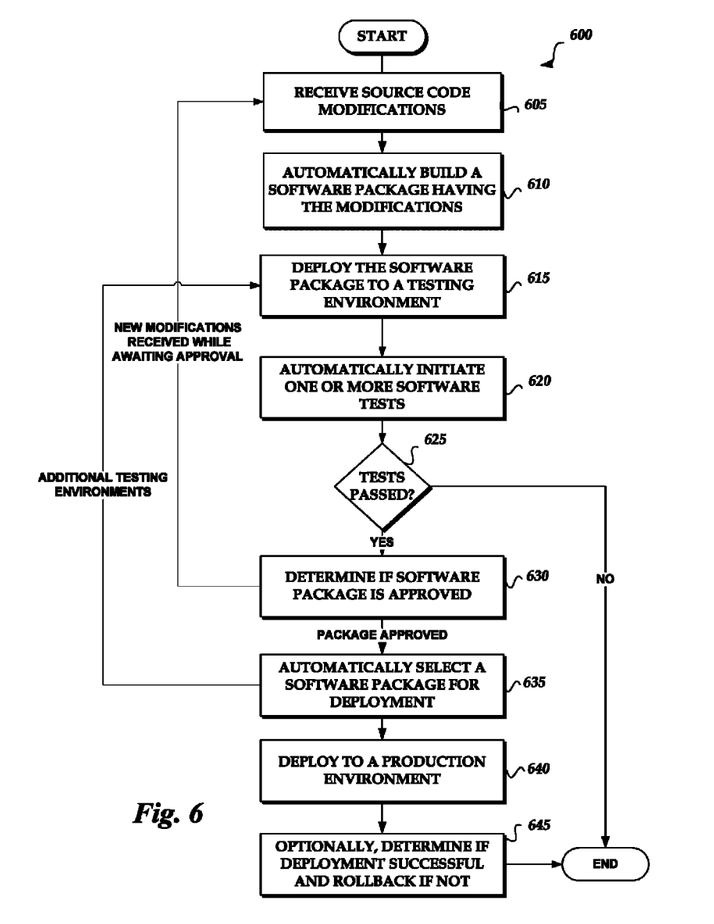
FIG. 6 schematically illustrates a logical flow diagram for an embodiment of a software deployment process that can implemented by the continuous deployment system of FIG. 1.

FIG. 6 schematically illustrates a logical flow diagram for an embodiment of a software deployment process 600. In some implementations, services are provided by embodiments the continuous deployment system 100 described with reference to FIG. 1 or by one of its components, such as the CDS interface 115 or CDS manager 130. For ease of explanation, the following describes the services as performed by the continuous deployment system 100. The example scenario is intended to illustrate, but not to limit, various aspects of the continuous deployment system 100. For example, the process described in the flow diagram may be accomplished using several workflows instead of one workflow. In one embodiment, the process can be fully dynamic, with some procedures omitted and others added. In one example, multiple instances of the process may be occurring concurrently, for different source code submissions.

Beginning at block 605, the continuous deployment system 100 receives source code modifications for a software project from a developer. The modifications can be received on the CDS interface 115 of FIG. 1 from a developer computing system 105 of FIG. 1. The software project can have many packages and the source code modifications may be only for one or a few of the packages.

At block 610, the continuous deployment system 100 automatically builds a software package having the modifications. The continuous deployment system 100 may also build the package into an application and deploy the software package as part of the application. If the package build is successful, the deployment process proceeds to block 615. In some situations, the build may fail and the continuous deployment system 100 may then notify a user that the build failed. The continuous deployment system 100 may then end the deployment process 600.

At block 615, the continuous deployment system 100 deploys the software package to a testing environment 125, which can be a deployment environment of a CDS stage 325 described in FIG. 3. In some situations, there may be multiple deployment environments and the continuous deployment system 100 can deploy the software package to one, all or a selection of the deployment environments. In one embodiment, the continuous deployment system 100 deploys the software package according to the promotion configuration settings provided by the user.

At block 620, the continuous deployment system 100 automatically initiates one or more software tests of the software package. Typically, during software development, developers create many software tests for an application. Such tests can check whether functionality provided by the code is working correctly, whether known bugs have been reintroduced, whether the performance of the application is within the desired parameters, and whether the results provided by the application are correct. In one embodiment, these software tests are organized by the continuous deployment system 100 into an approval workflow. Such an approval workflow can include the tests as well as other criteria that need to be met before the software package is approved. While running the tests, the continuous deployment system 100 can lock the CDS stage to prevent new deployments to the CDS stage from starting, thereby keeping the code base consistent during testing.

At block 625, the continuous deployment system 100 determines whether the one or more software tests have been passed (e.g., functionality tests, bug tests, performance tests, compliance tests, etc.). If the tests were not passed, the continuous deployment system 100 can end the deployment process 600. If the tests were passed, the deployment process proceeds to block 630. In some embodiments, the deployment process may proceed to block 630 even if some of the tests were not passed. For example, if the software package is functioning correctly but is not yet meeting desired performance criteria, the continuous deployment system 100 may proceed with the deployment.

In one embodiment, the continuous deployment system 100 can report the results of the tests to the user so that the user can know how the software package performed on the one or more software tests. For example, the continuous deployment system 100 may provide interactive feedback to the user including, for example, indications of when and/or for how long software tests will run and provide a real-time or near real-time status of the tests (or other parts of the deployment process 600). In some embodiments, the continuous deployment system 100 can generate a report detailing or summarizing the usage testing results and communicate the report to the user via electronic mail or provide access to the report, deployment status, or interactive feedback via Web services. For example, the continuous deployment system 100 may provide interactive and information screens such as those described in FIGS. 3-5. The continuous deployment system 100 can also include other screens, such as a change progress by time, audit history, or edit screen as described above.

At block 630, the continuous deployment system 100 determines if the software package is approved. Such approval may be provided automatically or manually. Automatic approval may be granted if the one or more software tests are passed. In some cases, the continuous deployment system 100 may be configured to delay approving the software package until certain criteria are met, such as waiting for a particular time or waiting for a scheduled event to occur. In some embodiments, the continuous deployment system 100 may be configured to request manual approval from the user. In those embodiments, the continuous deployment system 100 can designate the software package as ready for approval, notify the user the packages status, and await approval.

If new modifications are received while the continuous deployment system 100 is awaiting approval for the software package, the deployment process can proceed back to block 605 and process the new software package. The new software package would then proceed as described above until the deployment process 600 again reaches block 630. Thus, in some situations, there can be times when multiple packages are awaiting approval at block 630. In some situations, the new modifications can be received during other times in the process (e.g., at other blocks). If one or more software packages are approved, the deployment process can proceed to block 635.

At block 635, the continuous deployment system 100 automatically selects a software package for deployment. If there's only a single package ready for approval, then the continuous deployment system 100 selects that package for deployment to the next destination environment. If there are multiple software packages, then the continuous deployment system 100 determines which software packages to send to the next destination. For example, if there are multiple revisions of the same software package ready for deployment, the continuous deployment system 100 can pick the latest revision. The continuous deployment system 100 can pick which software package out of a plurality of packages to deploy based on the revision number, what software revisions are found on the destination environment, by revision priority, by the author of the changes, by a predetermined priority list, or by other selection criteria.

After selecting the software package (or packages) to deploy, the continuous deployment system 100 then deploys the software package to the destination environment. The destination environment could be a second testing environment (or third, fourth, etc.) or a production environment. If the destination is another testing environment, the deployment process 300 can proceed back to block 615 and repeat part of the process 300 described above. If the destination is a production environment, the process 300 proceeds to block 640.

At block 640, the continuous deployment system 100 deploys the software package to the production environment, which can be a deployment environment of a CDS stage 330 described in FIG. 3. In some situations, there may be multiple deployment environments and the continuous deployment system 100 can deploy the software package to one, all or a selection of the deployment environments. In one embodiment, the continuous deployment system 100 deploys the software package according to the promotion configuration settings provided by the user.

At block 645, the continuous deployment system 100 optionally determines if the deployment was successful and can rollback the deployment if it was not. During the deployment process, the continuous deployment system 100 can record rollback data, such as the version of the previous software package being replaced with the new software package and/or other data for rolling back a deployment. For example, in response to a triggering even, such as failure or error in the deployment environment, the continuous deployment system 100 can rollback to the previously deployed software package or otherwise return the deployment environment to the state it was in before the deployment. The rollback process (or the determination whether to rollback) may be initiated automatically or manually. After deploying the software package or rolling back the deployment, if needed, the deployment process 600 can end.

As described above, the continuous deployment system 100 can be implemented with one or more physical servers or computing machines, such as several computing machines interconnected via a network. Thus, each of the components depicted in the continuous deployment system 100 can include hardware and/or software for performing various features. In one embodiment, the continuous deployment system 100 is a web site or collection of web sites.

Like the continuous deployment system 100, developer computing systems 105 can be implemented in hardware and can include any type of computing device. The developer systems 105 can, but need not be, operated by entities who are different from one another and who are different from a user of the continuous deployment system 100. For example, the continuous deployment system 100 may be a web service made available to 3rd party developers by a web services provider for a fee or for free.

The continuous deployment system 100 can include one or more servers for receiving and responding to network requests from the developer computing devices 105. The one or more servers can include web servers, application servers, database servers, combinations of the same, or the like. In some embodiments, the network 110 is a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

The processing of the various components of the continuous deployment system 100 can be distributed across multiple machines, networks, and other computing resources. The various components of the continuous deployment system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the continuous deployment system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of programmatic interactions (additionally or alternatively) between the continuous deployment system 100 and the developer computing systems 105 are possible in addition to those described above. For example, a CDS submission or command be received directly from a user (e.g., via an interactive console or other GUI provided by the continuous deployment system 100) or from an executing program on a developer computing device 105. In some embodiments, users may interact with the continuous deployment system 100 using other types of interfaces and in other ways. For example, the continuous deployment system 100 may provide a web services interface (e.g., a web page or set of web pages) that allows a user to submit a request using a web browser. Other types of interfaces may also be used.

In some embodiments, a server computing system that has components including a central processing unit (CPU), input/output (I/O) components, storage, and memory may be used to execute the continuous deployment system 100 or specific components of the continuous deployment system 100. The executable code modules of the continuous deployment system 100 can be stored in the memory of the server and/or on other types of non-transitory computer-readable storage media. In some embodiments, the continuous deployment system 100 may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for deploying software, the method comprising:
   under control of a continuous deployment system comprising computing hardware:
   receiving first source code modifications to a source code package;
   automatically building a first software package of the source code package having the first source code modifications, the first software package comprising executable program instructions;
   receiving second source code modifications to the source code package;
   automatically building a second software package of the source code package having the second source code modifications, the second software package comprising executable program instructions;
   selecting the first software package for promotion from a source stage to a destination stage, wherein the first software package and the second software package are included on the source stage and approved for promotion to the destination stage, and wherein the first software package is compatible with a third software package included on the destination stage;
   automatically initiating one or more software tests against the first software package to determine whether to deploy the first software package, wherein automatically initiating one or more software tests comprises locking a testing environment on which the first software package operating to prevent additional deployments to the testing environment during testing;
   approving the first software package for promotion to a deployment environment when the one or more software tests are passed by the first software package, wherein the deployment environment comprises computer hardware and wherein the first software package is promoted through a plurality of stages prior to the promotion to the deployment environment; and
   in response to approving the first software package, causing the first software package to be deployed to the deployment environment.

2. The method of claim 1, wherein causing the first software package to be deployed comprises:
   determining a time window operative on the first software package; and
   deploying the first software package during a time when the time window is open.

3. The method of claim 1, further comprising automatically rolling back to a previously deployed version of the first software package when the one or more software tests are failed by the first software package.

4. The method of claim 1, the method further comprising: approving the second software package for promotion to the deployment environment when the one or more software tests are passed by the second software package, where in the second software package is promoted through the plurality of stages prior to the promotion to the deployment environment.

5. The method of claim 4, wherein the first software package and the second software package are built into a first application and a second application.

6. The method of claim 4, further comprising approving the first software package and the second software package for promotion in response to receiving from an input device an indication of a manual approval from a user.

7. The method of claim 6, wherein a user-selectable approve feature is presented on a presentation device associated with the continuous deployment system.

8. The method of claim 4, further comprising approving the second software package for promotion by automatically determining that the second software packages is associated with a later revision number than the first software package.

9. The method of claim 4, further comprising approving the second software package for promotion by automatically determining the second software packages has passed more software tests included in the one or more software tests than the first software package.

10. The method of claim 1, further comprising determining compatibility between the first software package and the third software package based at least partly on a revision number associated with the first software package and a revision number associated with the third software package.

11. A system for deploying software, the system comprising:
    a computer interface configured to receive first source code modifications and second source code modifications for a source code package; and
    a software deployment manager comprising computer hardware processor, the deployment manager configured to:
        automatically build a first software package of the source code package having the first source code modifications and a second software package of the source code package having the second source code modifications;
        select the first software package for promotion from a source stage to a destination stage, wherein the first software package and the second software package are included on the source stage and approved for promotion to the destination stage, and wherein the first software package is compatible with a third software package included on the destination stage;
        automatically initiate one or more software tests against the first software package to determine whether to promote a modified software package, wherein to automatically initiate the one or more software tests the deployment manager is configured to lock a testing environment on which the first software package is operating to prevent additional deployments to the testing environment during testing;
        approve the first software package for promotion to a deployment environment when the one or more software tests are passed by the first software package, wherein the first software package is promoted through a plurality of stages prior to the promotion to the deployment environment; and
        cause the first software package to be deployed to the deployment environment.

12. The system of claim 11, wherein the deployment manager is further configured to: approve the second software package for promotion to the deployment environment when the one or more software tests are passed by the second software package, where in the second software package is promoted through the plurality of stages prior to the promotion to the deployment environment.

13. The system of claim 11, wherein the system further comprises storage nodes configured to store source code related data, the source code related data comprises one or more of code changes, code versions, versioning data, change history, code backups, code metadata, developer identifications, and continuous deployment system events.

14. The system of claim 11, wherein the computer interface comprises a pipeline interface configured to report progress of deployment of the software.

15. The system of claim 14, wherein the pipeline interface is further configured to rollback to a previously deployed version of the first software package when the one or more software tests are failed by the first software package.

16. The system of claim 11, wherein the deployment environment is determined based at least partly on promotion configurations provided by a user.

17. The system of claim 11, wherein the deployment manager is further configured to determine compatibility between the first software package and the third software package based at least partly on associated revision numbers.

18. The system of claim 11, wherein each of the plurality of stages is involved with at least one software test that is different from software tests in other stages.

19. Non-transitory computer storage having stored thereon instructions that, when executed by a computer system, cause the computer system to:
    in response to receipt of first source code modifications to a source code package, automatically build a first executable software package of the first source code package having the source code modifications;
    in response to receipt of second source code modifications to a source code package, automatically build a second executable software package of the source code package having the second source code modifications;
    select the first executable software package for promotion from a source stage to a destination stage, wherein the first executable software package and the second executable software package are included on the source stage and approved for promotion to the destination stage, and wherein the first executable software package is compatible with a third executable software package included on the destination stage;
    deploy the first executable software package software package to a deployment environment;
    automatically initiate one or more software tests on the first executable software package to determine whether to deploy the first executable software package;
    approve the first executable software package for promotion to a deployment environment when the one or more software tests are passed by the first executable software package, wherein the first executable software package is promoted through a plurality of stages prior to the promotion to the deployment environment and automatically rolled back to a previously deployed version of the first executable software package when the one or more software tests are failed by the first executable software package; and
    cause the first executable software package to be deployed to a second deployment environment based at least partly on determining that the first executable software package includes latest approved revisions.

20. The non-transitory computer storage of claim 19, wherein each of the plurality of stages is involved with at least one software test that is different from software tests in other stages.

* * * * *